(12) United States Patent
Kuelbs

(10) Patent No.: US 6,830,009 B1
(45) Date of Patent: Dec. 14, 2004

(54) SOLAR POWERED BIRD FEEDER

(75) Inventor: Gregory G. Kuelbs, Westlake, TX (US)

(73) Assignee: World Factory, Inc., Southlake, TX (US)

( * ) Notice: Subject to any disclaimer, the term of this patent is extended or adjusted under 35 U.S.C. 154(b) by 0 days.

(21) Appl. No.: 10/411,565

(22) Filed: Apr. 10, 2003

Related U.S. Application Data

(60) Provisional application No. 60/372,267, filed on Apr. 11, 2003.

(51) Int. Cl.[7] .............................................. A01K 39/01
(52) U.S. Cl. ..................... 119/52.2; 119/57.8
(58) Field of Search .............................. 119/52.2, 57.8, 119/57.9, 428, 429

(56) References Cited

U.S. PATENT DOCUMENTS

| | | | | |
|---|---|---|---|---|
| 3,590,780 A | * | 7/1971 | Dunbar | 119/57.9 |
| 4,523,546 A | * | 6/1985 | Latham | 119/57.9 |
| 5,044,319 A | * | 9/1991 | Blasbalg | 119/57.9 |
| 5,207,180 A | * | 5/1993 | Graham | 119/52.3 |
| 5,259,337 A | * | 11/1993 | Rasmussen | 119/57.1 |
| 5,463,980 A | * | 11/1995 | Rasmussen | 119/57.1 |
| 5,868,101 A | * | 2/1999 | Marshall | 119/428 |
| 6,145,477 A | * | 11/2000 | Jansen | 119/416 |
| 6,276,298 B1 | * | 8/2001 | Welsh | 119/52.3 |
| 6,363,891 B1 | * | 4/2002 | Marshall | 119/719 |
| 6,481,375 B1 | * | 11/2002 | Scalf | 119/52.2 |
| 6,584,933 B1 | * | 7/2003 | Stone | 119/57.9 |
| 2003/0019437 A1 | * | 1/2003 | Fore | 119/57.92 |
| 2003/0024480 A1 | * | 2/2003 | Meritt | 119/61 |

* cited by examiner

Primary Examiner—Yvonne R. Abbott
(74) Attorney, Agent, or Firm—Melvin A. Hunn

(57) ABSTRACT

A bird feeder having a rechargeable electrical power source and a solar energy system that collects solar energy, converts it into electrical energy, and uses the electrical energy to recharge the rechargeable electrical power source. The rechargeable electrical power source can be used to power a wide variety of electrical devices, such as microphones, radio receivers or transmitters, cameras, audio recording and playback devices, video recording and playback devices, loud speakers, lighting elements, timing devices, remote controls, motors, etc.

7 Claims, 5 Drawing Sheets

SOLAR POWERED BIRD FEEDER

This application claims the benefit of U.S. Provisional Application No. 60/372,267, filed 11 Apr. 2002, titled "Solar Powered Bird Feeder."

BACKGROUND OF THE INVENTION

1. Field of the Invention

The present invention relates to bird feeders. In particular, the present invention relates to bird feeders having electrical power sources.

2. Description of Related Art

Solar energy systems that collect solar energy and convert it into electrical energy have been around for many years. However, only recently have these solar energy systems been developed to the point where they are small enough, efficient enough, and economical enough, to allow their widespread use in small electrical devices. One use of these small solar energy systems is to recharge rechargeable batteries in small household devices.

One example of a small household electrical device with rechargeable batteries that can be recharged by one of these small solar energy systems is an outdoor landscaping lighting system. The rechargeable batteries provide power to illuminate the lighting elements during darkness, and the solar energy system collects and converts solar energy and recharges the rechargeable batteries during daylight.

Although the use of small solar energy systems in outdoor landscaping lighting systems represents great strides in the development and use of solar energy systems, there is a need for these miniaturized solar energy systems in other small electrical household devices.

BRIEF SUMMARY OF THE INVENTION

There is a need for solar powered bird feeder.

Therefore, it is an object of the present invention to provide a solar powered bird feeder.

This object is achieved by providing a bird feeder having a rechargeable electrical power source and a solar energy system that collects solar energy, converts it into electrical energy, and uses the electrical energy to recharge the rechargeable electrical power source. The rechargeable electrical power source can be used to power lights, radios, cameras, and a wide variety of other electrical devices operably associated with the bird feeder.

The solar powered bird feeder according to the present invention provides significant advantages, including: (1) the rechargeable electrical power source can be recharged by the solar energy system; (2) the rechargeable electrical power source can provide power to a wide variety of electrical devices operably associated with the bird feeder; and (3) the lighting elements allow the bird feeder to be viewed and enjoyed at night. Other objects and advantages of the present invention will be evident from the following detailed description of the invention.

DETAILED DESCRIPTION OF THE PREFERRED EMBODIMENT

Although the present invention will be described herein with reference to a bird feeder having a particular configuration, it should be understood that the methods and apparatuses of the present invention can be used on bird feeders and bird houses of almost any shape or design, as well as on other small animal feeders and houses. Thus, it will be appreciated that the rechargeable electrical power source and solar recharging system of the present invention is well suited for use on any decorative outdoor accessory.

Figure 1:
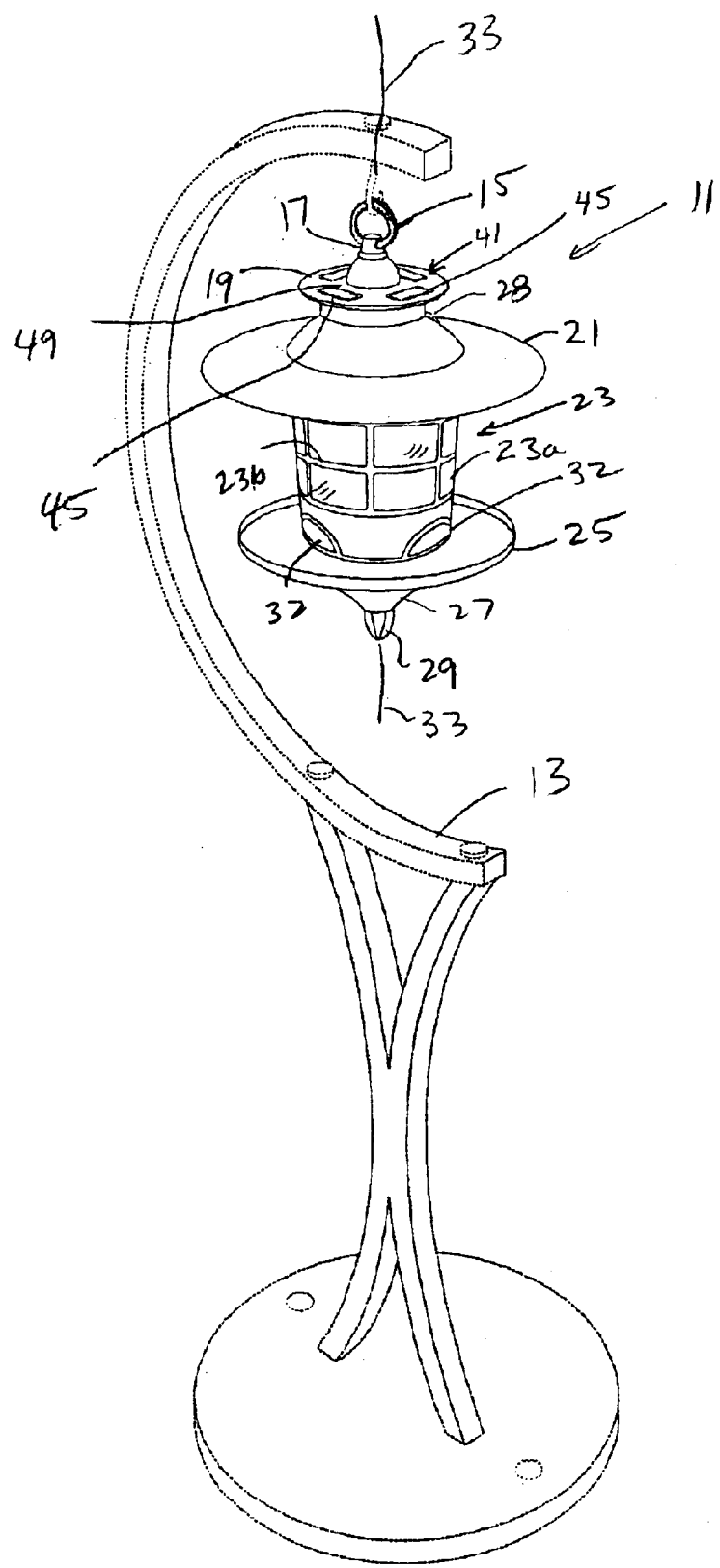
FIG. 1 is a is a perspective view of the solar powered bird feeder according to the present invention.
Figure 2:
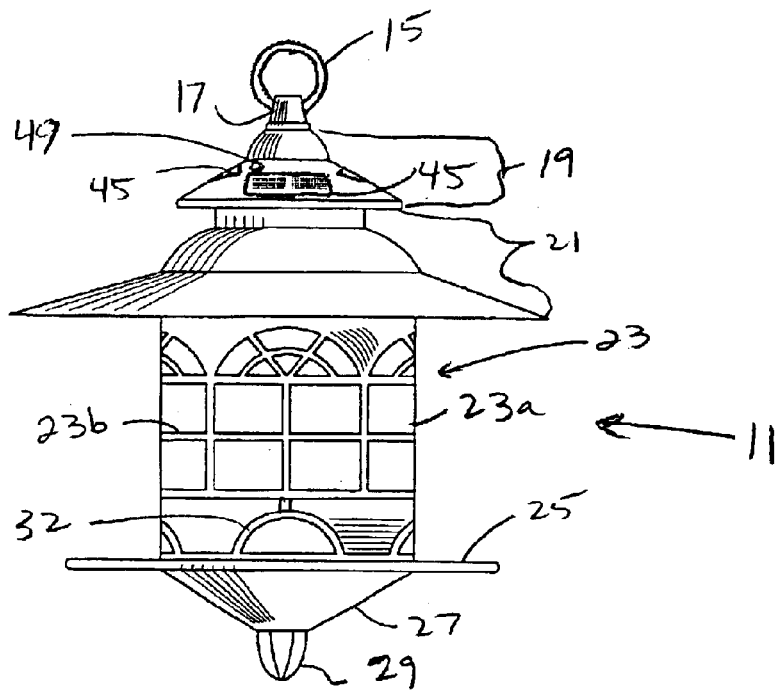
FIG. 2 is a front view of the solar powered bird feeder of FIG. 1.
Figure 3:
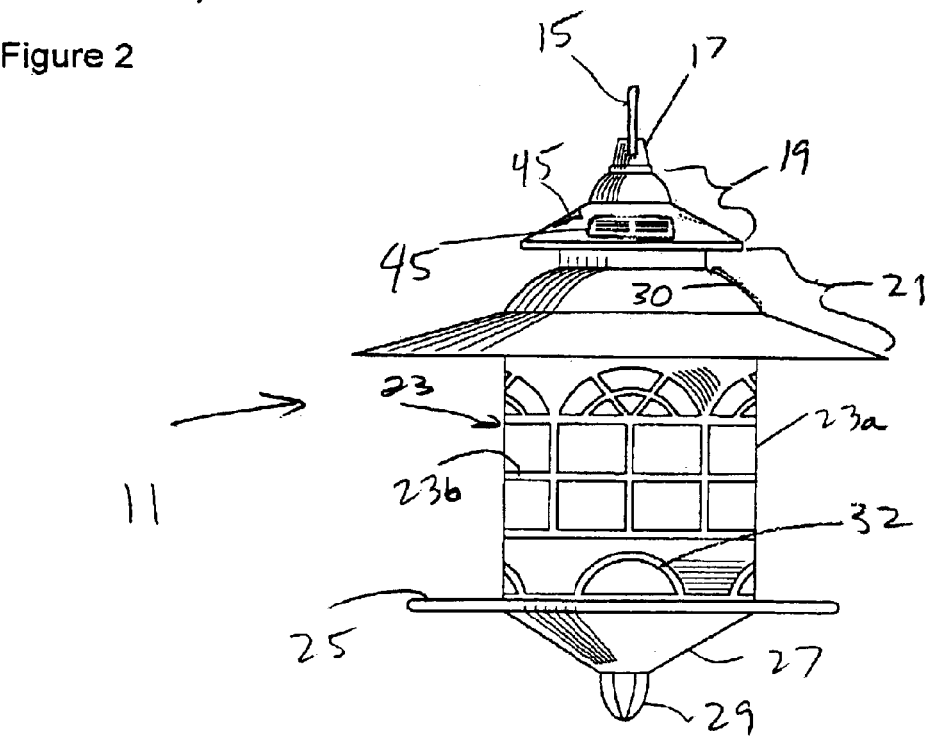
FIG. 3 is a right side view of the solar powered bird feeder of FIG. 1.
Figure 4:
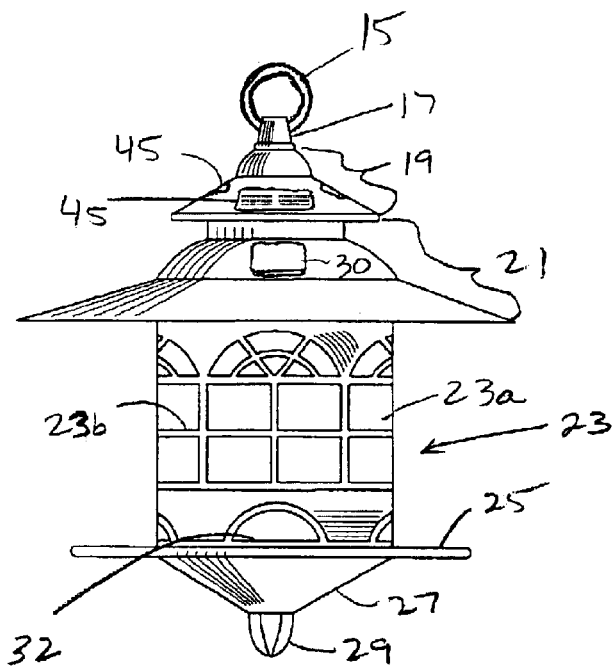
FIG. 4 is a rear view of the solar powered bird feeder of FIG. 1.
Figure 5:
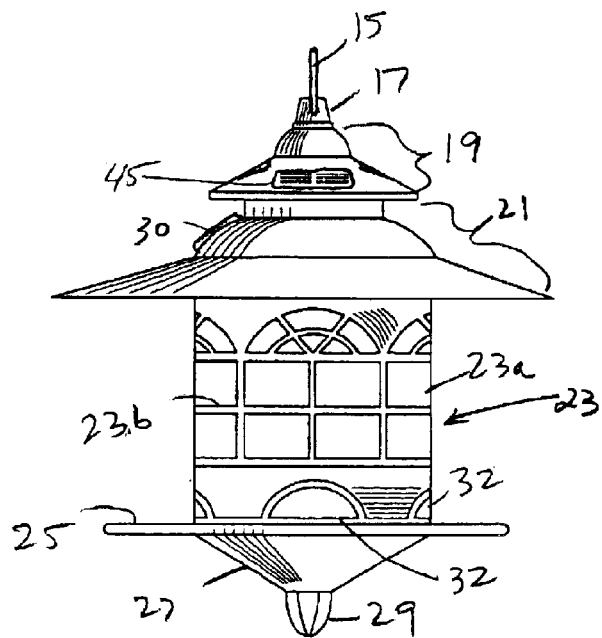
FIG. 5 is a left side view of the solar powered bird feeder of FIG. 1.
Figure 6:
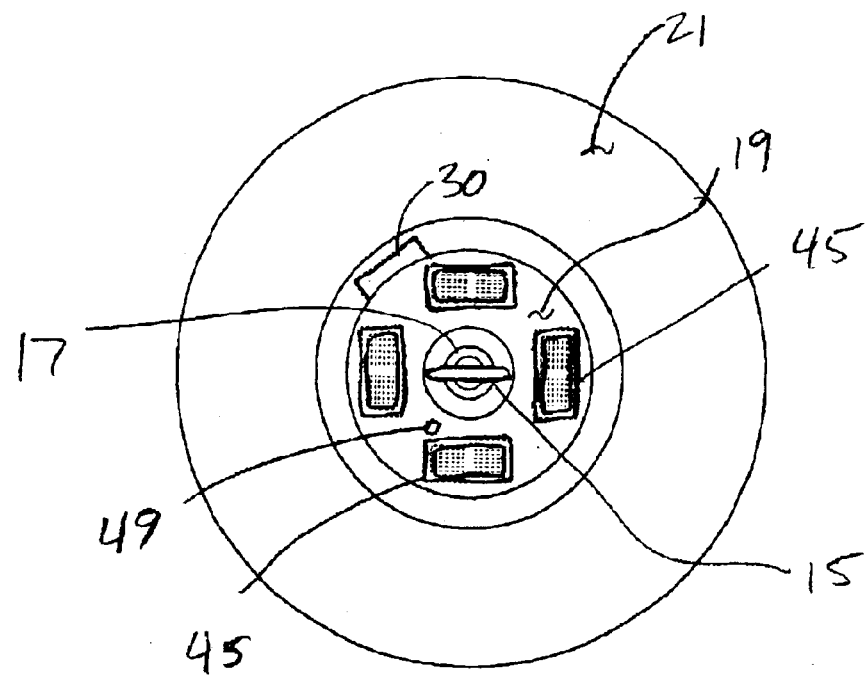
FIG. 6 is a top plan view of the solar powered bird feeder of FIG. 1.
Figure 7:
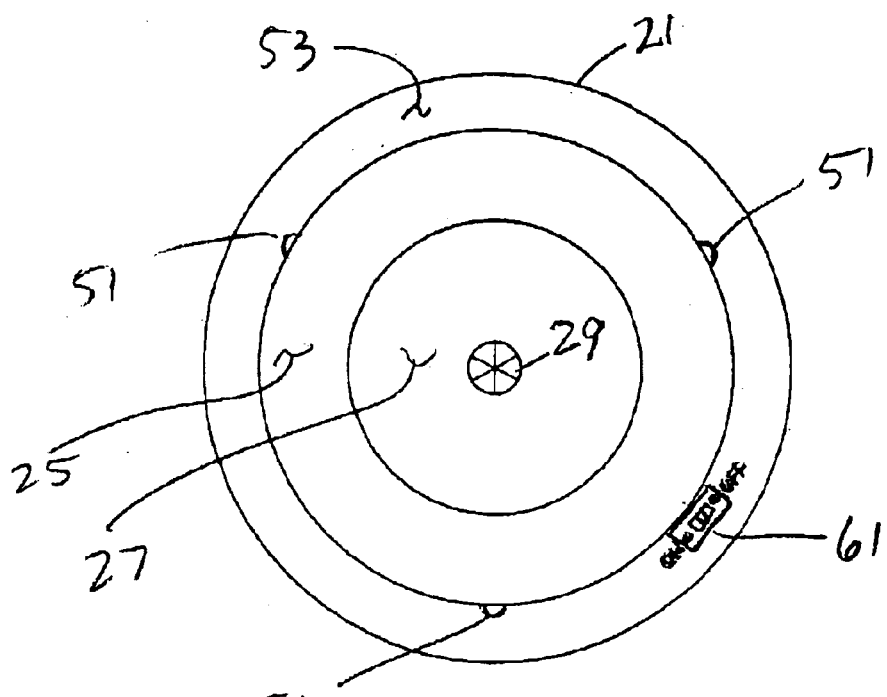
FIG. 7 is a bottom view of the solar powered bird feeder of FIG. 1.
Figure 8:
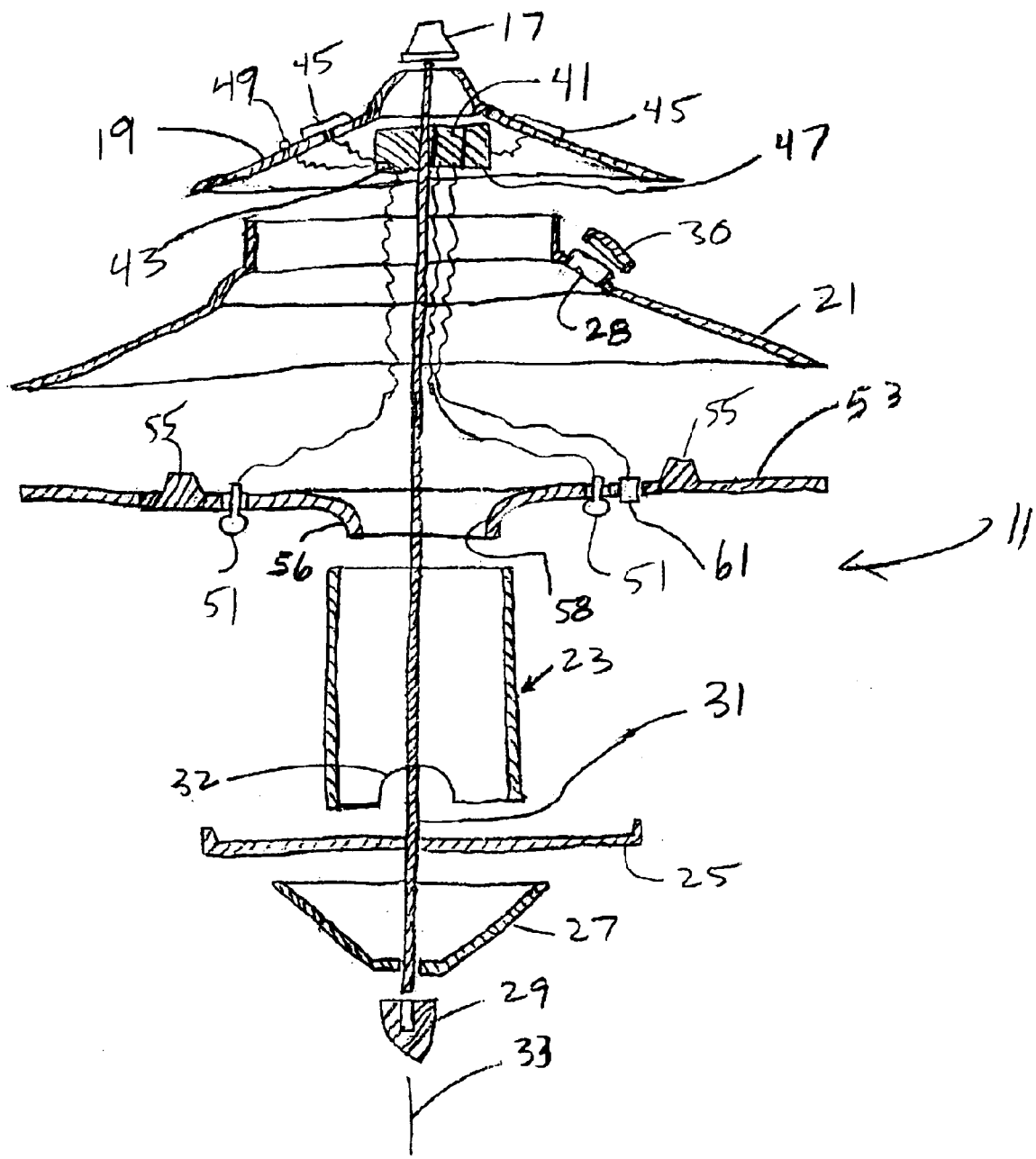
FIG. 8 is an exploded longitudinal cross-sectional view of the solar powered bird feeder of FIG. 1.
Figure 1:
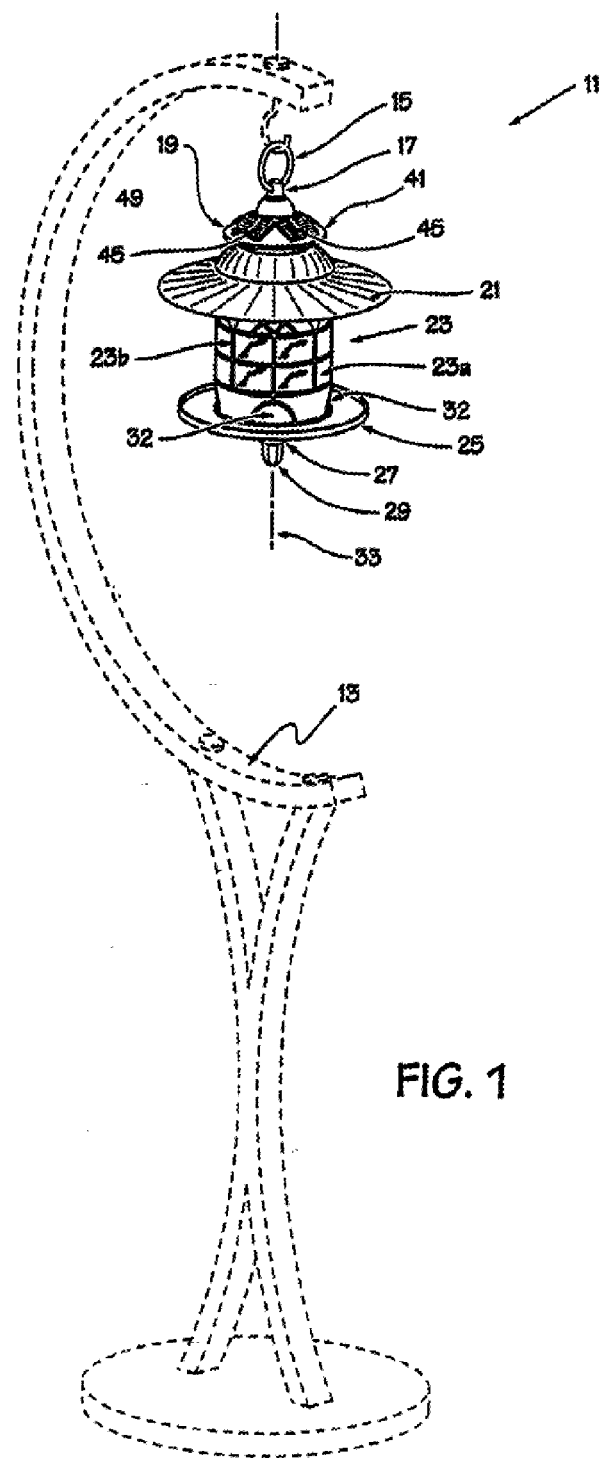
Figure 2:
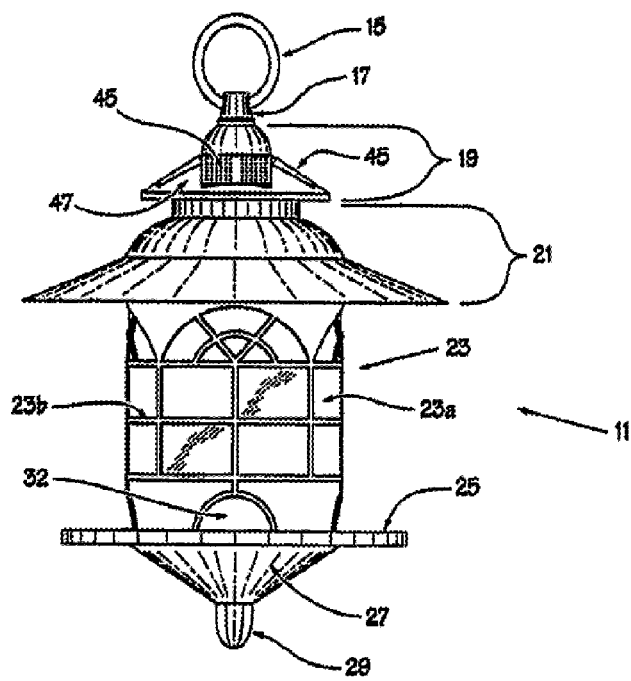
Figure 3:
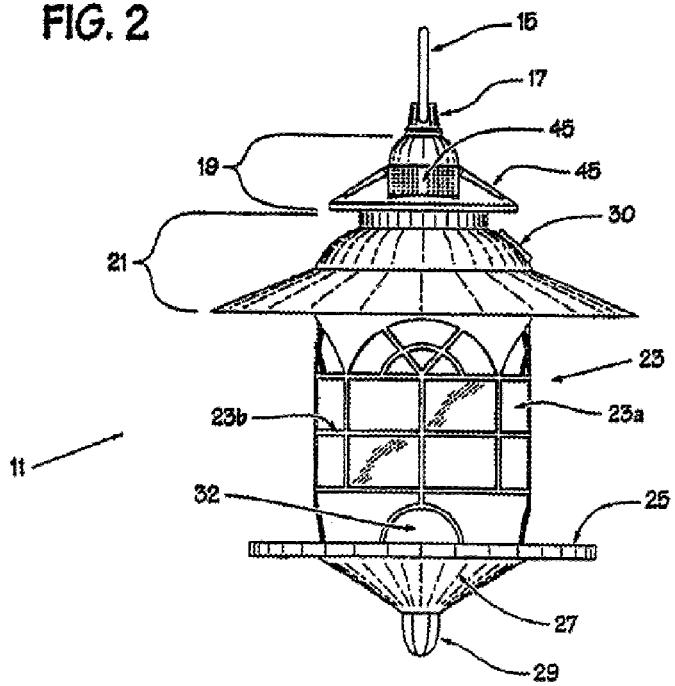
Figure 4:
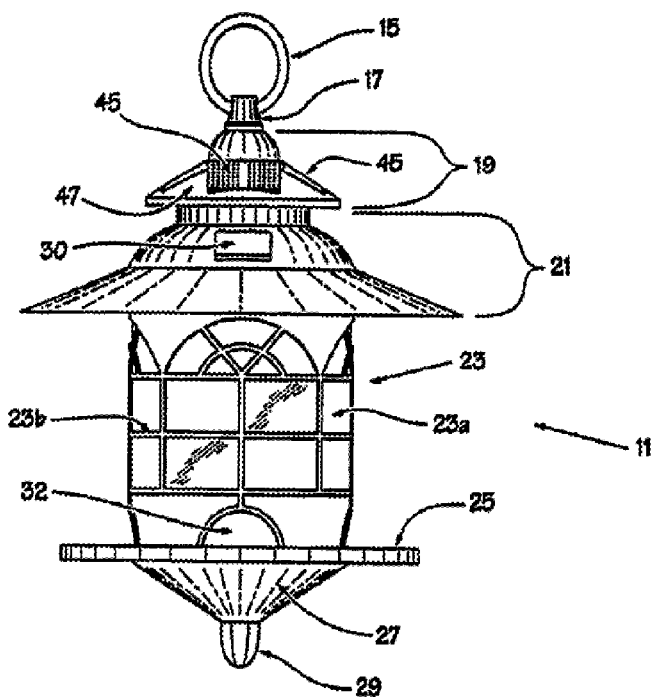
Figure 5:
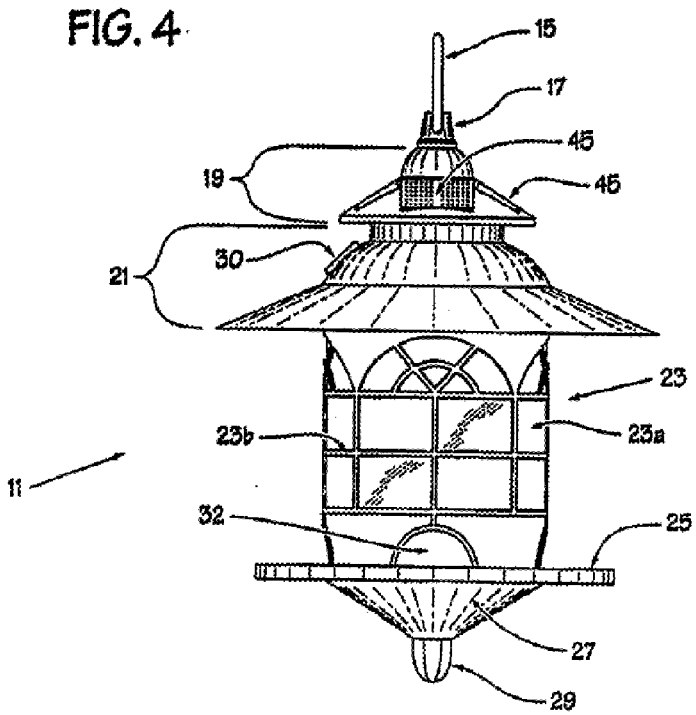
Figure 6:
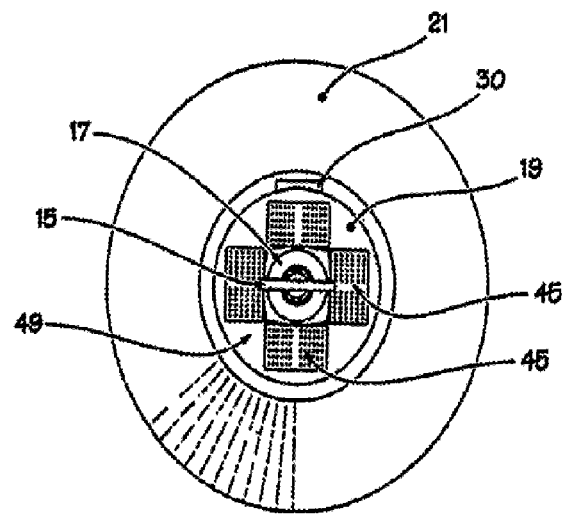
Figure 7:
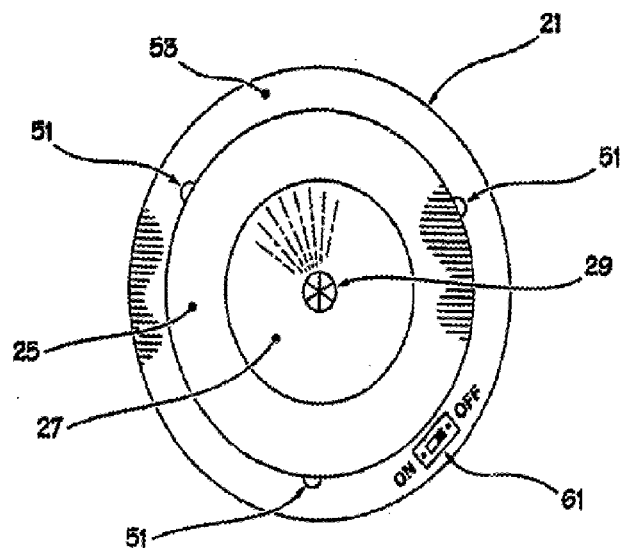
Figure 8:
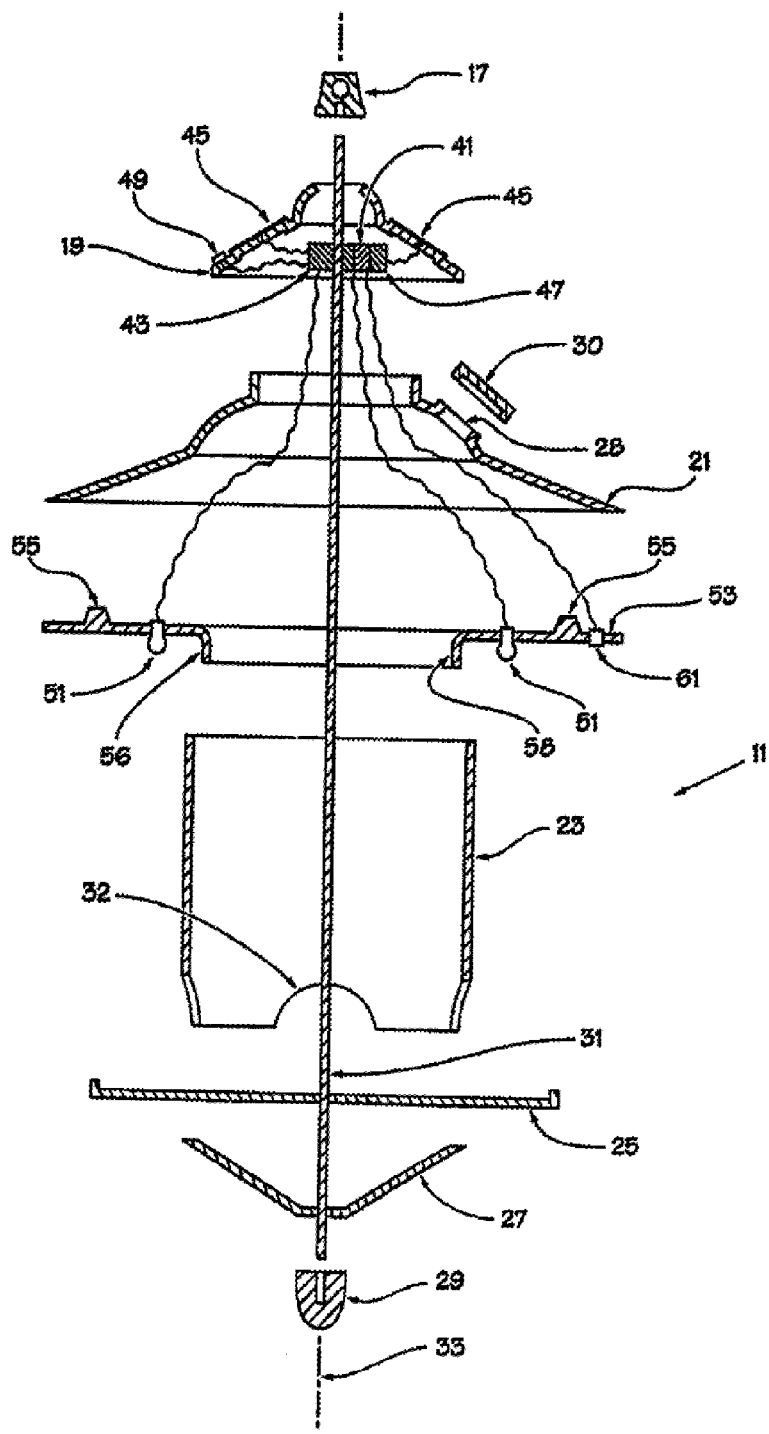

Referring to FIGS. 1–8 in the drawings, the preferred embodiment of a solar powered bird feeder 11 according to the present invention is illustrated. Bird feeder 11 is adapted to be hung on a stand 13, in a tree, on a hanging bracket, from a rope or cable, or by any of a wide variety of conventional hanging means. Stand 13 is shown in dashed lines to indicated that stand 13 may be of any suitable design.

In the preferred embodiment, bird feeder 11 has a hanging means 15, an upper cap member 17, an upper canopy 19, a main canopy 21, a food reservoir 23, a perch 25, a lower portion 27, and a lower finial 29. Hanging means 15, upper cap member 17, upper canopy 19, main canopy 21, food reservoir 23, perch 25, lower portion 27, and lower finial 29 are coupled together by a rod 31 (see FIG. 8) that passes along a central longitudinal axis 33 of bird feeder 11 and that is releasably connected to lower finial 29 and upper cap member 17. It should be understood that rod 31 may also be a chain, wire, cable, or any other type of connecting means which aids in holding the components of bird feeder 11 together.

Upper cap member 17, upper canopy 19, main canopy 21, perch 25, lower portion 27, and lower finial 29 are preferably made of a suitable material that is treated, finished, and/or coated to prevent rust, wear, and exposure to the environment. It should be understood that hanging means 15, upper cap member 17, upper canopy 19, and main canopy 21 may be integrally combined into one or more component parts, depending on their shape, the application in which they are used, or the ornamental design that they are intended to represent. For example, these components may include embossed figurines or cut-out shapes that enhance the appearance or motif of bird feeder 11.

Food reservoir 23 includes at least one outlet port 32 through which birds may gather the bird food. Outlet ports 32 may be located on food reservoir 23 at various locations and heights, such as at low locations near perch 25 or high locations near main canopy 21. Outlet ports 32 may also include flanges (not shown) that extend into or out of food reservoir 23 to prevent the bird food from spilling out of outlet ports 32 unnecessarily. Bird feeder 11 may also include additional perches that extend outwardly from food reservoir 23 for birds to use while gathering the bird food. Such additional perches are particularly useful for outlet ports 32 that are located well above perch 25.

Food reservoir 23 may include a liner portion 23a, preferably made of transparent glass or plastic, and a decorative lattice portion 23b, preferably made of a suitable material that is treated, finished, and/or coated to prevent rust, wear, and exposure to the bird food or the environment. Liner portion 23a may be beveled, etched, colored, tinted, or otherwise treated, depending upon the effect desired. For example, food reservoir 23 may be formed from leaded glass or stained glass having a decorative appearance or motif. Furthermore, it should be understood that the liner portion 23a and lattice portion 23b may be integrally combined to form a single component. For instances in which liner portion 23a and lattice portion 23b are separate components, it will be appreciated that lattice portion 23b may be disposed on either the inside or the outside of liner portion 23a.

A food access port 28 is disposed in main canopy 21 to allow a user to fill food reservoir 23 with bird food without disassembling bird feeder 11. Food access port 28 is preferably covered by a cap 30 (see FIGS. 4 and 8) to protect the bird food in food reservoir 23 from the weather. Cap 30 may be attached to bird feeder 11 by a wide variety of attachment means. It should be understood that food access port 28 may be located in several locations on bird feeder 11, depending upon the application in which bird feeder 11 is used, and the effect that is desired.

A rechargeable electrical power source 41 is operably associated with bird feeder 11 to provide electrical power to bird feeder 11. In the preferred embodiment, rechargeable electrical power source 41 is disposed within upper canopy 19. It will be appreciated that rechargeable electrical power source 41 may also be disposed in other components of bird feeder 11, such as perch 25 or lower portion 27, and may be disposed in multiple components of bird feeder 11. Rechargeable electrical power source 41 is preferably two 1.2 Volt rechargeable AA NiCd batteries providing about 600 milliamps of current, but may be any of a wide variety of rechargeable batteries. An electrical charging system 43 (see FIG. 8) is conductively coupled to rechargeable electrical power source 41. Electrical charging system 43 may include an electrical access port (not shown) to receive an adapter or transformer (not shown) that allows rechargeable electrical power source 41 to be recharged by a conventional AC power source, such as an AC wall outlet. It will be understood that rechargeable electrical power source 41 may be used to power a wide variety of electrical devices, such as microphones, radio receivers or transmitters, cameras, audio recording and playback devices, video recording and playback devices, loud speakers, lighting elements, timing devices, remote controls, motors, etc.

At least one conventional solar collector 45 is operably associated with bird feeder 11 to collect solar energy. In the preferred embodiment, at least one solar collector 45 is disposed on the upper surface of upper canopy 19. Solar collectors 45 either include or are conductively coupled to a conventional solar energy conversion system 47 that converts the solar energy to electrical energy. Electrical charging system 43 uses the electrical energy from the solar energy conversion system 47 or the AC power outlet to recharge rechargeable electrical power source 41. An optional photoresistor 49 disposed on the upper surface of upper canopy 19 is conductively coupled to rechargeable electrical power source 41 to detect the amount of light hitting bird feeder 11 and to provide a corresponding electrical signal that can be used to determine whether power is supplied to certain electrical components.

In the preferred embodiment, the electrical power from rechargeable electrical power source 41 is used to illuminate at least one lighting element 51. It is preferred that lighting element 51 be positioned to cast light on and/or through food reservoir 23, perch 25, and as many other components of bird feeder 11 as possible. In the preferred embodiment, lighting elements 51 are disposed beneath main canopy 19. Lighting elements 51 preferably illuminate food reservoir 23 and perch 25 in a decorative fashion. Thus, it will be appreciated that the configuration and choice of materials for food reservoir 23 may produce a distinctive effect on the appearance of bird feeder 11 while being illuminated by lighting elements 51. In the preferred embodiment, lighting elements 51 comprise one or more LED's. It should be understood that lighting elements may also be fluorescent lighting elements, cold cathode ray tube lighting elements, and/or any other suitable lighting elements.

In the preferred embodiment, lighting elements 51 are carried by an alignment disk 53. Alignment disk 53 is disposed between main canopy 21 and food reservoir 23. It should be understood that alignment disk 53 may be integral with either main canopy 21 or food reservoir 23, or both main canopy 21 and food reservoir 23. Alignment disk 53 includes a plurality of tabs 55 which provide spacing and a means of attaching alignment disk 53 to main canopy 21. Alignment disk 53 may include an annular flange 56 that extends downward from a central aperture 58. Flange 56 preferably has an outside diameter that is slightly smaller that the inside diameter of food reservoir 23, such that flange 56 may protrude slightly into the interior of food reservoir 23. This aligns and centers food reservoir 23 about axis 33. It should be understood that the functions of alignment disk 53 may be achieved by other means, such as tabs, spacers, posts, or clips coupled to main canopy 19. Alignment disk 53, or its functional equivalent, may include conduits or clips for aligning and/or holding and protecting any electrical wiring that is necessary for any electrical components that are operable on bird feeder 11.

An optional on/off switch 61 may be disposed on bird feeder 11 and conductively coupled to rechargeable electrical power source 41 to provide a means to manually activate and deactivate the power from rechargeable electrical power source 41, the power to lighting elements 51, and/or any other electrical components that may be operably associated with bird feeder 11. On/Off switch 61 is preferably disposed beneath main canopy 21 on alignment disk 53. In the preferred embodiment, on/off switch 61 overrides the switching functions of photoresistor 49. It should be understood that one or more on/off switches 61 and their corresponding control circuitry may be utilized to control the various electrical components on bird feeder 11.

It will be appreciated that an invention with significant advantages has been described. Although the present invention is shown in a limited number of forms, it is not limited to just these forms, but is amenable to various changes and modifications without departing from the spirit thereof.

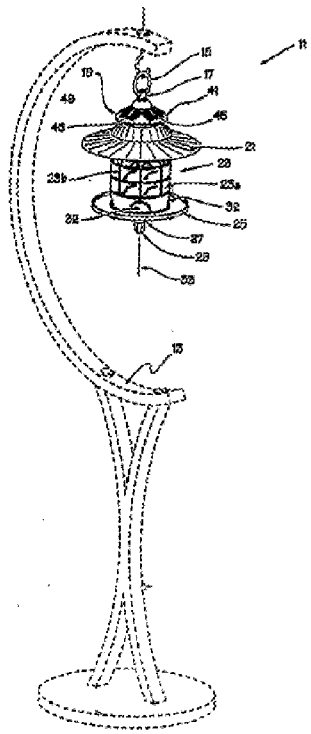

I claim:

1. A bird feeder comprising
at least one canopy portion;
a food reservoir coupled to the canopy portion;
a perch portion coupled to the food reservoir;
a rechargeable electrical power source;
at least one lighting element conductively coupled to the rechargeable electrical power source; and a solar energy system conductively coupled to the rechargeable electrical power source for collecting solar energy, converting the solar energy into electrical energy, and recharging the rechargeable electrical power source with the converted electrical energy wherein the at least one lighting element is a cold cathode ray tube.

2. A bird feeder comprising:

at least one canopy portion;

a food reservoir coupled to the canopy portion;

a perch portion coupled to the food reservoir;

a rechargeable electrical power source;

at least one lighting element conductively coupled to the rechargeable electrical power source; and a solar energy system conductively coupled to the rechargeable electrical power source for collecting solar energy, converting the solar energy into electrical energy, and recharging the rechargeable electrical power source with the converted electrical energy wherein the at least one lighting element is a fluorescent light.

3. A bird feeder, further comprising:

at least one canopy portion;

a food reservoir coupled to the canopy portion;

a perch portion coupled to the food reservoir;

a rechargeable electrical power source;

at least one lighting element conductively coupled to the rechargeable electrical power source; and a solar energy system conductively coupled to the rechargeable electrical power source for collecting solar energy, converting the solar energy into electrical energy, and recharging the rechargeable electrical power source with the converted electrical energy an electrical charging system coupled to the rechargeable electrical power source for recharging the rechargeable electrical power source, the electrical charging system being adapted to receive power from an AC power source.

4. A bird feeder comprising:

an upper canopy;

a lower canopy disposed below the upper canopy;

a food reservoir disposed below the upper canopy;

a perch disposed below the food reservoir;

a lower portion disposed below the perch;

a means for releasably connecting the upper canopy, the lower canopy, the food reservoir, the perch, and the lower portion together;

a rechargeable electrical power source carried by the upper canopy for providing electrical power to the bird feeder;

an electrical charging system conductively coupled to the rechargeable electrical power source for recharging the rechargeable electrical power source; and a solar energy system conductively coupled to the electrical charging system for collecting solar energy, converting the solar energy into electrical energy, and transferring the electrical energy to the electrical charging system.

5. The bird feeder according to claim 4, further comprising:

at least one lighting element conductively coupled to the rechargeable electrical power source.

6. The bird feeder according to claim 4, further comprising:

an alignment means coupled to the lower canopy for aligning the food reservoir.

7. The bird feeder according to claim 4, wherein the electrical charging system is adapted to receive power from an AC power source.

* * * * *

UNITED STATES PATENT AND TRADEMARK OFFICE
CERTIFICATE OF CORRECTION

| | | |
|---|---|---|
| PATENT NO. | : 6,830,009 B1 | |
| APPLICATION NO. | : 10/411565 | |
| DATED | : December 14, 2004 | |
| INVENTOR(S) | : Gregory G. Kuelbs | |

It is certified that error appears in the above-identified patent and that said Letters Patent is hereby corrected as shown below:

The title page showing the illustrative figure should be deleted to be replaced with the attached title page.

The drawing sheets, 1-5 consisting of Figs. 1-8, should be deleted to be replaced with drawing sheets, consisting of Figs. 1-8, as shown on the attached page.

On the title page item (60),
replace the Related U.S. Applicaiton Data of the issued patent with: Provisional applicaiton No. 60/372,267, filed on Apri. 11, 2002.

Signed and Sealed this

Fifth Day of December, 2006

JON W. DUDAS
*Director of the United States Patent and Trademark Office*

(12) United States Patent
Kuelbs

(10) Patent No.: US 6,830,009 B1
(45) Date of Patent: Dec. 14, 2004

(54) SOLAR POWERED BIRD FEEDER

(75) Inventor: Gregory G. Kuelbs, Westlake, TX (US)

(73) Assignee: World Factory, Inc., Southlake, TX (US)

(*) Notice: Subject to any disclaimer, the term of this patent is extended or adjusted under 35 U.S.C. 154(b) by 0 days.

(21) Appl. No.: 10/411,565

(22) Filed: Apr. 10, 2003

Related U.S. Application Data

(60) Provisional application No. 60/372,267, filed on Apr. 11, 2003.

(51) Int. Cl.[7] .................................................. A01K 39/01
(52) U.S. Cl. .................................... 119/52.2; 119/57.8
(58) Field of Search ........................... 119/52.2, 57.8, 119/57.9, 428, 429

(56) References Cited

U.S. PATENT DOCUMENTS

| | | | | |
|---|---|---|---|---|
| 3,590,780 A | * | 7/1971 | Dunbar | 119/57.9 |
| 4,523,546 A | * | 6/1985 | Latham | 119/57.9 |
| 5,044,319 A | * | 9/1991 | Blasbalg | 119/57.9 |
| 5,207,180 A | * | 5/1993 | Graham | 119/52.3 |
| 5,259,337 A | * | 11/1993 | Rasmussen | 119/57.1 |
| 5,463,980 A | * | 11/1995 | Rasmussen | 119/57.1 |
| 5,868,101 A | * | 2/1999 | Marshall | 119/428 |
| 6,145,477 A | * | 11/2000 | Jansen | 119/416 |
| 6,276,298 B1 | * | 8/2001 | Welsh | 119/52.3 |
| 6,363,891 B1 | * | 4/2002 | Marshall | 119/719 |
| 6,481,375 B1 | * | 11/2002 | Scalf | 119/52.2 |
| 6,584,933 B1 | * | 7/2003 | Stone | 119/57.9 |
| 2003/0019437 A1 | * | 1/2003 | Fore | 119/57.92 |
| 2003/0024480 A1 | * | 2/2003 | Merill | 119/61 |

* cited by examiner

*Primary Examiner*—Yvonne R. Abbott
(74) *Attorney, Agent, or Firm*—Melvin A. Hunn

(57) ABSTRACT

A bird feeder having a rechargeable electrical power source and a solar energy system that collects solar energy, converts it into electrical energy, and uses the electrical energy to recharge the rechargeable electrical power source. The rechargeable electrical power source can be used to power a wide variety of electrical devices, such as microphones, radio receivers or transmitters, cameras, audio recording and playback devices, video recording and playback devices, loud speakers, lighting elements, timing devices, remote controls, motors, etc.

7 Claims, 5 Drawing Sheets